United States Patent [19]

Hart

[11] Patent Number: 5,208,601

[45] Date of Patent: May 4, 1993

[54] ALL-WEATHER PRECISION LANDING SYSTEM FOR AIRCRAFT IN REMOTE AREAS

[75] Inventor: Gerald E. Hart, McLean, Va.

[73] Assignee: The United States of America as represented by the Secretary of the Navy, Washington, D.C.

[21] Appl. No.: 556,606

[22] Filed: Jul. 24, 1990

[51] Int. Cl.[5] .................... G01S 1/14; G01S 13/91
[52] U.S. Cl. ......................................... 342/33; 342/7
[58] Field of Search ................ 342/33, 7, 23, 188

[56] References Cited

U.S. PATENT DOCUMENTS

| | | | |
|---|---|---|---|
| 2,786,198 | 3/1957 | Weil et al. | 342/7 |
| 2,793,362 | 5/1957 | Öberg | 342/6 |
| 2,872,675 | 2/1959 | Kennaugh | 342/7 |
| 3,243,816 | 3/1966 | Chisholm | 342/6 |
| 3,716,855 | 2/1973 | Asam | 342/33 |
| 3,716,860 | 2/1973 | Bechtel | 342/33 |
| 3,739,385 | 6/1973 | Bechtel et al. | 343/705 |
| 3,765,019 | 10/1973 | Kosowsky | 342/33 |
| 3,875,551 | 4/1975 | Young | 342/7 |
| 3,887,926 | 6/1975 | Schwartz et al. | 342/374 X |
| 4,037,228 | 7/1977 | Pearson | 342/7 |
| 4,099,183 | 7/1978 | Wolff | 342/5 |
| 4,100,548 | 7/1978 | Hemmi et al. | 343/837 |
| 4,104,634 | 8/1978 | Gillard et al. | 342/7 |
| 4,283,725 | 8/1981 | Chisholm | 342/174 |
| 4,352,106 | 9/1982 | Firth | 342/7 |
| 4,724,436 | 2/1988 | Johansen et al. | 342/7 |
| 4,785,301 | 11/1988 | Schäfer et al. | 342/7 |
| 4,843,396 | 6/1989 | Macikunas et al. | 342/7 |
| 4,944,572 | 7/1990 | Young | 350/167 |
| 4,972,192 | 11/1990 | Bruder | 342/6 |
| 4,990,918 | 2/1991 | Michelson et al. | 342/7 |
| 4,996,536 | 2/1991 | Broadhurst | 343/912 |

OTHER PUBLICATIONS

Clary, George R., "Development and Flight Test of an X-Band Precision Approach Concept for Remote-Area Rotocraft Operations", Aug., 1983, pp. 1-8, NASA Technical Memo 84398.

Primary Examiner—John B. Sotomayor
Attorney, Agent, or Firm—Thomas E. McDonnell; Edward F. Miles

[57] ABSTRACT

An all-weather aircraft landing system includes a plurality of ground based passive 90° dihedral reflectors for producing two-bounce reflected signals without ground reflections, and an airborne radar system which may transmit and receive "same sense" circularly polarized radiation, while completely rejecting "opposite sense" polarization returns or else utilizing them to indicate weather conditions. Radar clutter from objects such as rain, buildings and trees which produce opposite sense reflections are rejected by the "same sense" receiver or switched to an "opposite sense" receiver to provide weather/obstacle condition information. By properly orienting a plurality of 90° dihedral angle reflectors of a particular size in a predetermined array pattern and tilt-angle adjacent a runway, the reflections from airborne radar signals are processed and displayed to provide a visual means for determining glide slope deviation and approach vector of the landing aircraft. In a preferred embodiment, two (portable) reflectors are utilized in conjunction with a conventional linearly polarized wave airborne radar system (e.g., standard modern weather radar), requiring no modifications to the airborne equipment while still providing an inexpensive means to obtain precise visual indication of glide slope and approach vector information.

15 Claims, 9 Drawing Sheets

ON GLIDE SLOPE

BELOW GLIDE SLOPE

ABOVE GLIDE SLOPE

ALL-WEATHER PRECISION LANDING SYSTEM FOR AIRCRAFT IN REMOTE AREAS

BACKGROUND OF THE INVENTION

The invention relates to aircraft landing guidance systems, and more particularly to an all weather aircraft landing system employing passive dihedral reflectors located adjacent a landing strip.

A variety of aircraft guidance systems are known which provide landing approach information via cooperation between a radar system housed in the aircraft and a series of passive ground reflectors arranged adjacent a runway. The general approach employed in these systems is to utilize the reflectors as targets which the airborne radar system detects in order to determine the glide slope angle and azimuth of the approaching aircraft with respect to a landing strip.

An example of such a system is disclosed in U.S. Pat. No. 3,716,855 to Asam, which utilizes a pair of passive corner reflectors which act as ideal point targets. One of the reflectors is shaped to direct a first radar reflection pattern beneath the runway glide slope, and the other reflector is shaped to direct a second radar reflection pattern above the runway glide slope. The two reflection patterns provide equal amplitude radar returns along the glide slope. The relative amplitudes of radar return signals from the two reflectors determines the position of the aircraft with respect to the glide slope path.

As another example, U.S. Pat. No. 3,765,019 to Kosowsky discloses a similar landing system employing a plurality of passive reflectors located adjacent a runway and each oriented to reflect radar energy transmitted from a radar system in an aircraft approaching a runway only within certain angles of a preferred approach vector. The pattern of return signals received by the airborne radar system is decoded to determine the aircrafts deviation from the desired approach vector.

The reference "Development and Flight Test of an X-Band Precision Approach Concept for Remote-Area Rotorcraft Operations" by G. R. Clary and J. P. Chisholm presented at the IEEE/A1AA 5th Digital Avionics Systems Conference, Seattle, Washington, Oct. 31-- Nov. 3, 1983, discloses a landing system for rotorcraft utilizing a plurality of passive reflectors. The reflectors are arranged about the landing location so as to provide directional signals to a landing craft via a pattern of reflected beams. The desired glidepath is defined by the deviation in proportional signal strength within the overlapping reflected beams.

Further, U.S. Pat. No. 4,104,634 to Gillard discloses trihedral ground plane corner reflectors for use at small elevation angles (i.e., below the Brewster angle) comprising three mutually perpendicular planes for reflecting circularly polarized radar transmissions to provide navigation information to aircraft approaching at low elevations.

Another example is U.S. Pat. No. 3,243,816 to Chisholm, which discloses a final approach landing system which also utilizes a system of ground reflectors. At least one of the reflectors as disclosed by Chisholm requires a lens in front for providing the reflector with a reflectivity pattern indicative of the preferred glide path.

Although each of the systems described above is capable of providing an aircraft with landing information via cooperation between a series of passive reflectors and an airborne radar system, these prior art systems have various limitations with respect to complexity of design, susceptibility to clutter interference, site requirements for the reflectors, and/or ease of operation.

For example, the Gillard reflectors require that the ground reflecting surface is sufficiently flat that it acts as a single reflecting plane. This approach may be quite dangerous in that it relies on ground reflections which, in the case of a circularly polarized signal, may result in a degradation of the reflected signal.

It is critical that the reflection characteristics of the reflectors be specifically defined. This requires a method of determining the beam width of the reflection in order that a sharp cut-off in the reflected beam power is provided to indicate a deviation from the desired approach. The reflectors must then be precisely oriented about the landing area in order to reliably define the glide slope for the approaching aircraft. Previous systems did not utilize a dihedral reflector having precisely defined reflection characteristics for use in an aircraft landing system. Furthermore, these systems fail to provide a method in which the dihedral reflectors may be precisely oriented such that their reflected beam patterns provide the aircraft with accurate landing information.

SUMMARY OF THE INVENTION

A principal object of the present invention is to provide an improved passive reflector system for navigation during an aircraft's approach to a runway, or other landing strip, which is free from influence by clutter such as buildings, trees and rain, and which can be used at virtually any site.

It is a further object of the present invention to provide a passive reflector system which may be manufactured economically and provides a large radar reflectivity cross-section in a light weight portable structure.

Another object of the present invention is to provide an inexpensive all-weather approach and landing system that utilizes readily available conventional weather radar equipment commonly installed in many aircraft with no modifications to the equipment required.

Another object of the present invention is to provide a precision all-weather approach and landing system capable of use by aircraft only equipped with non-circularly-polarized wave radar equipment.

A still further object of the present invention is to provide a precision all-weather approach and landing system utilizing a minimum number of 90° dihedral ground-based reflectors that produce an extremely sharp two-bounce vertical reflected beamwidth.

These and other objects are achieved in accordance with the present invention by utilizing two or more 90° dihedral angle ground-based reflectors of particular size, position, relative spacing, and tilt-angle so as to permit accurate use with either a sophisticated circularly-polarized wave airborne radar system or a conventional linearly-polarized wave airborne weather radar system.

A number of 90° dihedral reflectors are positioned in a predetermined array adjacent to the landing runway. This array provides an approaching aircraft's radar receiver with a safe, reliable indication of the aircraft's position with respect to the runway, under all types of weather conditions. To accomplish this, the array acts to form an upper and lower reflected beam envelope within which the landing aircraft centers itself in order to maintain a desired glide slope angle. Each reflector has a −3 dB beam width angle $\beta$ for the reflected signal power within its reflected beam envelope that is determined by the relationship $$\beta = \left( \frac{50^\circ \lambda}{b} \right)$$

where $\lambda$ is the wavelength of the radar signal and b is the height of the dihedral reflector.

In addition, the array produces a left/right reflected beam envelope within which the landing aircraft may also center itself in order to maintain a desired approach vector.

One embodiment of the landing system comprises a "dual purpose" airborne radar system that utilizes a flat-plate dual orthogonal slot array antenna for generating circularly-polarized waves that can be switched from same sense signal reception for landing operations to opposite sense signal reception for weather information. A two-pulse decoder, "finger" gate generator, and an amplitude comparison system with a crossed-pointer indicator provide a pilot with information approximating a standard ILS (Instrument Landing System) that eliminates rain interferences and false targets (e.g., buildings, trees) and positively identifies an airfield by decoding the reflections from the unique specifically positioned dihedral reflector array. A pilot activated switch is also provided to allow monitoring of an "opposite sense" signal indicative of ambient weather conditions.

A second preferred embodiment utilizes inexpensive airborne radar equipment comprising standard conventional modern weather radar which typically generates linearly polarized waves and is used in conjunction with two critically angled and specifically positioned dihedral ground-based reflectors of light-weight and portable construction. No modifications are required to the airborne weather radar equipment. However, the ground-based reflectors are typically larger than that used for the circular polarization system embodiment in order to override interference and false targets.

Visual comparisons of the relative amplitudes (i.e. signal strengths) of the reflected echoes are based on the "azimuth" dimension or arc length of the radar return "blips" produced by the reflectors as displayed on the radar screen. Although the screen brightness for radar weather returns is uniform for all returns regardless of returned signal strength (making a quantitative comparison difficult), the arc length of the radar return "blip" displayed on the screen will increase as the received radar signal level increases. Thus, a reliable visual comparison of relative radar return "blip" arc lengths (which will correspond to relative signal strengths) is possible by a pilot's judicious use of the screen display gain control.

These and other objects, features and advantages of the present invention are described in or apparent from the following detailed description of the preferred embodiments.

BRIEF DESCRIPTION OF THE DRAWINGS

The preferred embodiments will be described with reference to the appended drawings, in which like elements have been denoted with like reference numerals throughout the figures, and in which.

DETAILED DESCRIPTION OF THE PREFERRED EMBODIMENTS

Figure 1:
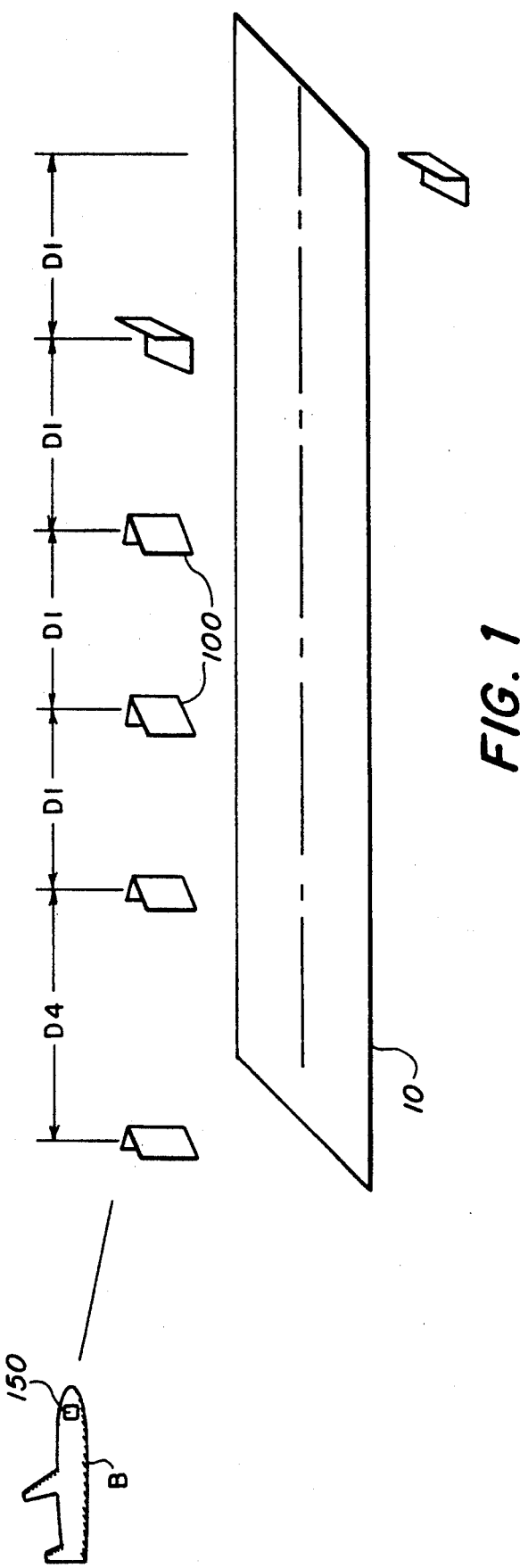
FIG. 1 is a diagrammatic view of a runway with six 90° dihedral angle corner reflectors arranged adjacent the runway according to the present invention to act as targets for a radar system aboard an aircraft approaching the runway.
Figure 2A:
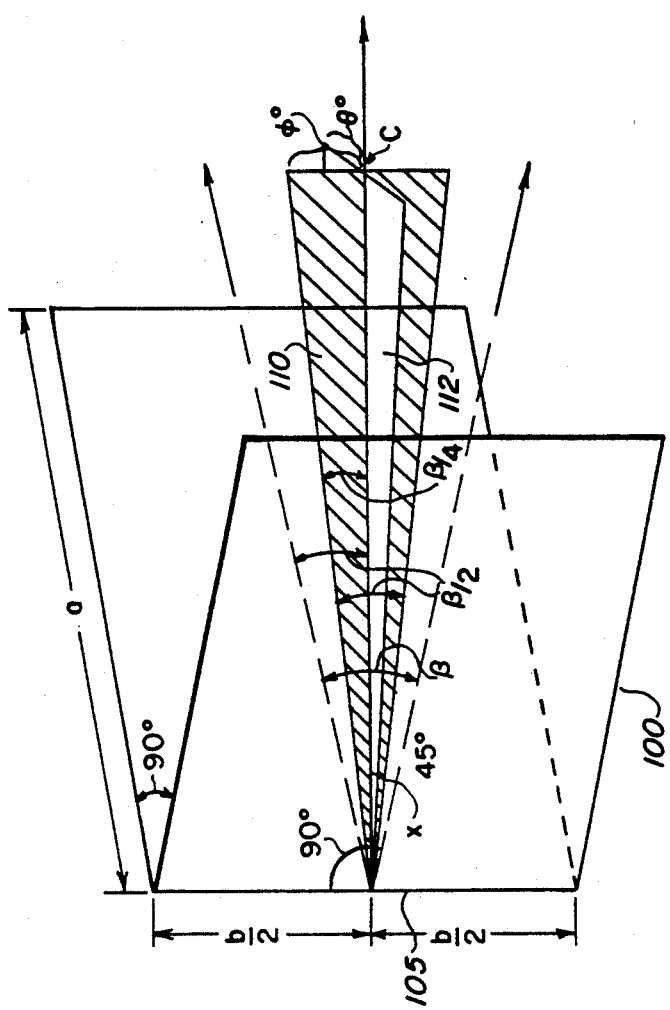
FIGS. 2 and 2A are isometric views of a 90° dihedral corner reflector.
Figure 2:
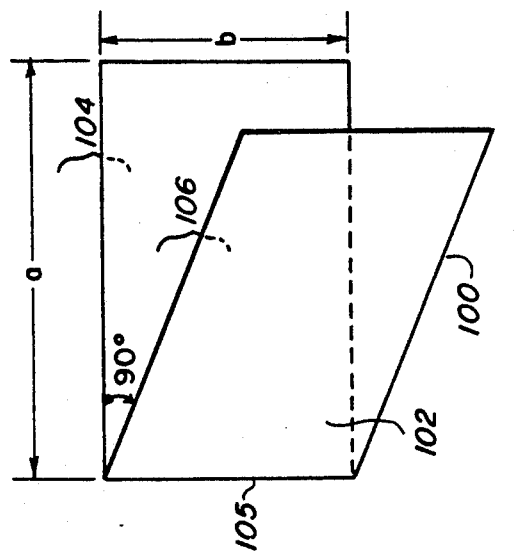

Referring to FIG. 1, an all weather landing guidance system 5 constructed in accordance with the present invention comprises an array of passive reflector elements 100 positioned adjacent a landing runway 10, and a radar system 150 housed in an aircraft B. As shown in FIG. 2, each passive reflector element 100 is configured as a 90° dihedral angle corner reflector comprising two identical rectangular panels 102 and 104 having electrically reflective planar inner surfaces 106 and joined at a junction 105 forming a 90° angle between surfaces 106. (As used herein, the term "corner" denotes the intersection of two surfaces.) Each reflector panel has a length dimension "a" and a height dimension "b", with junction 105 preferably being hinged along height b so that reflector 100 is collapsible. Panels 102 and 104 are preferably made of a light weight material or laminate of materials, such as, e.g., 1.0–1.5 inch thick polystyrene covered with aluminum foil, so that a plurality of reflectors can be carried by one person.

Figure 3:
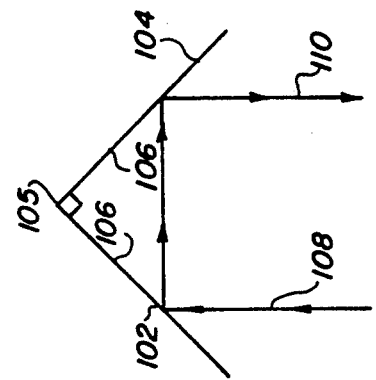
FIG. 3 is a plan view of a 90° dihedral corner reflector.

The dihedral reflector 100 functions to produce a "two-bounce" reflection of incident radiation. As shown in FIG. 3, an incident signal 108 (such as a radar pulse) strikes the electrically reflective surface 106 of panel 102 at an incident angle. The once-reflected signal 108 then experiences a second reflective bounce on the reflective surface 106 of panel 104. Because the present invention utilizes a 90° dihedral angle reflector, the reflected signal 110 returns towards the signal source in a plane parallel to the path travelled by the incident signal 108.

The two-bounce reflective properties of the dihedral reflector provide a same rotational sense reflection of a circularly polarized signal. Such same-sense reflection serves to reduce radar interference caused by cultural targets such as buildings, water tanks, and silos, plus large tree trunks and heavy rain. However, the same type of dihederal reflector can be made to perform adequately with a linearly polarized radar system (e.g., standard modern weather radar equipment) as disclosed in an alternate embodiment of the all-weather approach and landing system below.

In the present invention, a radar system 150 housed in an aircraft B receives a reflected signal from each individual dihedral reflector 100. The amplitude of each reflection received is functionally dependent on the reflective beam pattern of each respective reflector 100. Referring to FIG. 2A, maximum reflected power is received from the dihedral corner reflector 100 when the radar source is located along a line through point C which is the intersection of a vertical plane 110 that bisects the 90° dihedral angle, and a horizontal plane 112 which bisects the reflector edge 105 normal to plane 110.

The reflector must be oriented so as to produce a narrow reflected beam in the vertical plane because aircraft deviations from course are much more critical vertically than laterally. By orienting the reflector so that reflector edge 105 is vertical (i.e., the plane 110 that bisects the dihedral angle is vertical), the reflected vertical plane beamwidth will be quite narrow as seen from FIG. 2A.

The lateral beamwidth should be quite broad in order to simplify the problem of locating the reflectors. As seen below, the dihedral reflector fulfills this requirement. The ratio of the signal level where the radar source is displaced at some deviation angle $\theta°$ (e.g., in plane 112) from the plane 110 that bisects the dihedral angle to the signal level where $\theta° = 0°$ is given by:

$$\frac{P_1}{P_2} = \frac{[\sin(45° - \theta°)]^2}{[\sin(45° - 0°)]^2} = \frac{[\sin(45° - \theta°)]^2}{0.5} \quad (1)$$

where $P_1$ = signal level at deviation angle $\theta°$ and $P_2$ = signal level where $\theta° = 0°$.

Figure 4:
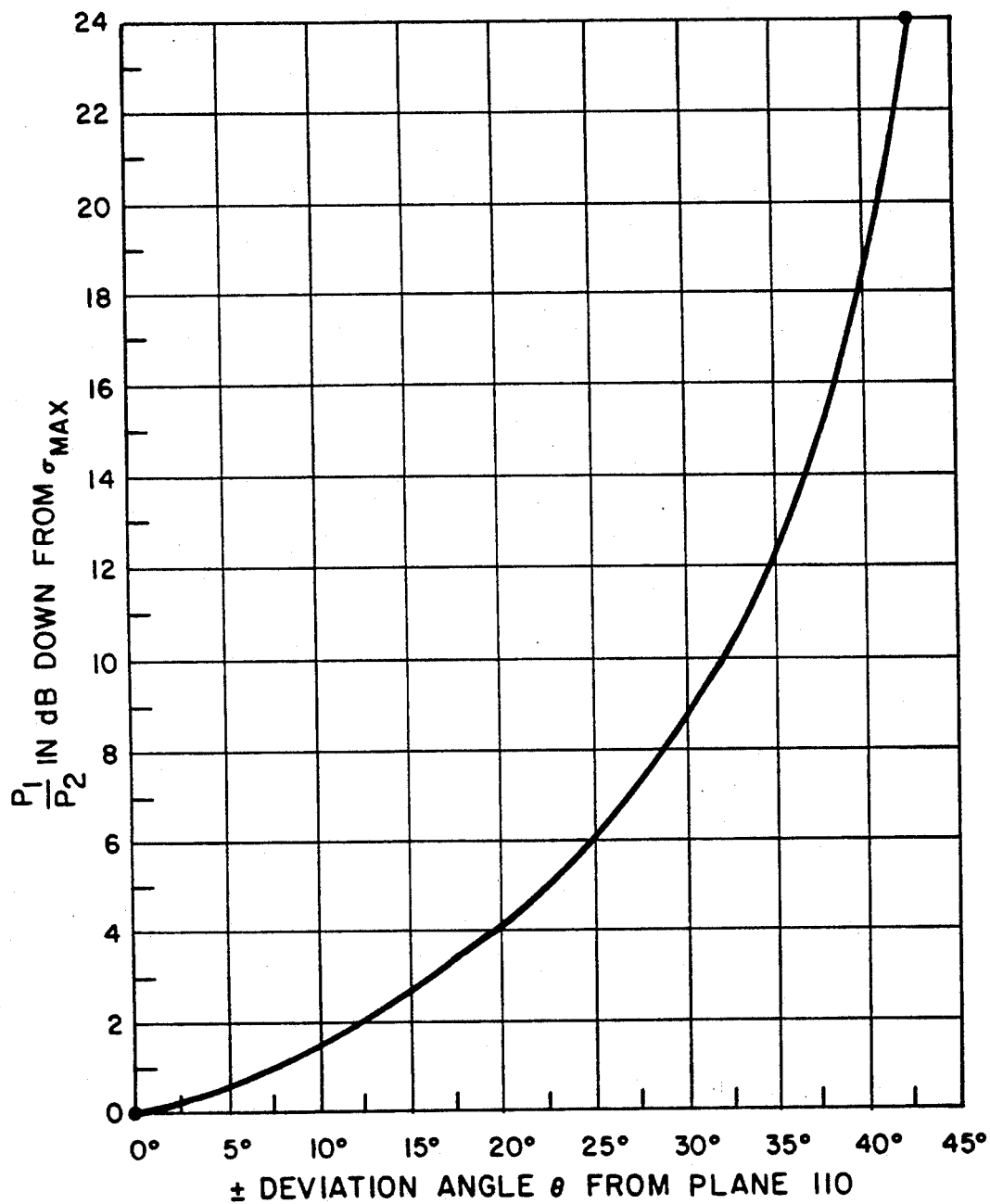
FIG. 4 is a graph of the loss of reflected signal strength versus lateral deviation of an airborne radar transmitter from a plane that bisects the dihedral angle of a reflector according to the present invention.

FIG. 4 shows the loss of reflected signal strength for a lateral deviation from a plane 110 that bisects the dihedral angle when reflector edge 105 is vertical. The loss of reflected signal strength is shown as a ratio of $P_1$ to $P_2$ with the ratio converted to decibels and plotted versus the deviation angle $\theta°$ from plane 110.

Referring again to FIG. 2A, upon a deviation $\theta°$ of the radar system (where both the transmitting and receiving antenna are located at the same position) in plane 112 about an axis formed by junction 105 (referred to as a deviation in azimuth), the relative reflected power received by the radar system varies in proportion to $[\sin(45° - |\theta°|)]^2$, where $|\theta°|$ is the absolute value of deviation from 0°. Thus, the maximum received power of the reflected beam in the horizontal plane occurs at $\theta° = 0°$. As a result, the half-power, or $-3$ dB point (i.e., where the received signal power is 3 dB down from maximum) of an azimuth plane reflected beam pattern occurs at $\theta° = \pm 15°$, as shown in FIG. 4. The $-3$ d points are conventionally used in describing a radar signal beam width.

Moreover, since the value of the reflector's maximum effective Radar Cross-section (MRX) is proportional to the maximum reflected power ($\sigma_{max}$) in the horizontal plane 112, the maximum reflected power in plane 112 is described by the equation:

$$\sigma_{max} \approx MRX = \frac{8\pi a^2 b^2}{\lambda^2} \quad (2)$$

where a and b are the length and height, respectively, in centimeters of the reflector panels 102, 104; and $\lambda$ is the wavelength of the radar signal in centimeters.

If, for example, a reflector having 2 ft. × 1 ft. panels is used, then a = 24 inches = 60.96 cm, b = 12 inches = 30.48 cm, and if $\lambda = 3.2$ cm, then the maximum effective Radar Cross-section is equal to 847.3 m². Similarly, from equation (2) above, the maximum effective Radar Cross-section for a 4 ft × 4 ft. dihedral reflector of the above embodiment becomes 54,230 sq.m. Thus, this arrangement produces a "large" (high power) return signal while confining the reflection to a very narrow beam.

Conversely, the relationship that governs the relative reflected power received by the radar system in a vertical or elevation plane is much different. More precisely, the $-3$ dB points have a reflected beam width angle $\beta$ in the vertical plane that bisects the reflector's dihedral angle (i.e., elevation-plane 110) given by the equation:

$$\beta = \left(\frac{50°\lambda}{b}\right) \quad (3)$$

where $\lambda$ is the wavelength of the radar signal and b is the height of the dihedral reflector in centimeters. Referring again to FIG. 2A, the vertical angle from the horizontal plane 112 bisecting reflector edge 105 to a 3 dB down point is $\beta/2°$. However, this would only apply to the situation where a receiver measuring the reflected power is located away from bisecting plane 112 and a transmitter is located in plane 112 (e.g., at point C on the reflector axis).

However, since the reflected beam shifts in a direction opposite to that in which the transmitter is moved, vertical deviation of an airborne radar system within plane 110 (referred to as a deviation in elevation), results in a shifting of the elevation plane reflected beamwidth pattern such that a $-3$ dB point, $\phi(3$ dB), is encountered at an angle $\beta/4°$ from the reflector centerline, as described by the equation:

$$\phi(3dB) = \frac{\beta°}{4} = \left(\frac{50°\lambda}{4b}\right) \quad (4)$$

where $\lambda$ is the wavelength of the radar signal and b is the height of the dihedral reflector.

If for example, $\lambda = 3.2$ cm (at X-band) and b = 121.9 cm (= 48 in.) then $$\phi(3dB) = \frac{50° \times 3.2}{4 \times 121.9} = 0.328°$$

Figure 6:
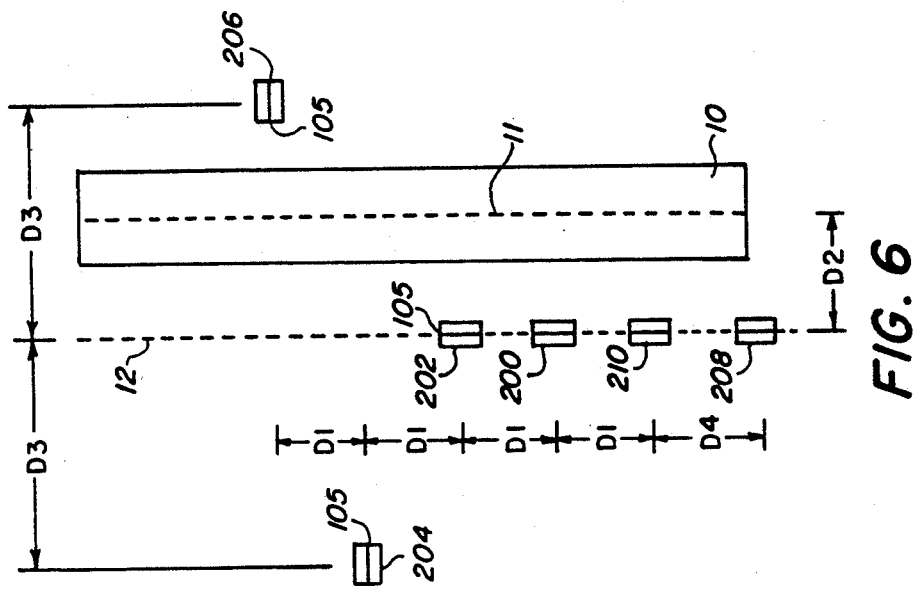
FIG. 6 is a overhead plan view of a runway with six 90° dihedral angle corner reflectors arranged adjacent the runway.
Figure 5A:
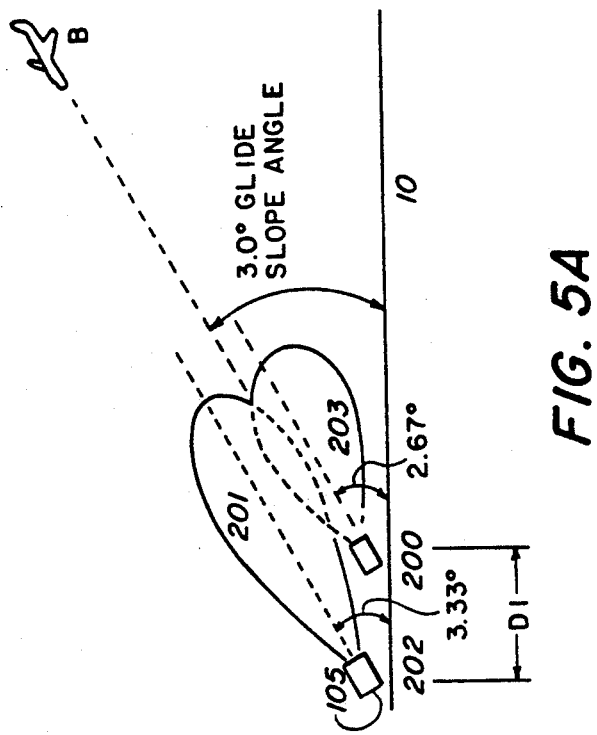
FIG. 5A is a diagrammatic view of the vertical reflective beam patterns for two dihedral corner reflectors forming a median beam pattern along the desired glide slope.

As shown in FIGS. 5A and 6, two identical 90° dihedral reflectors 200 and 202 are positioned a distance D1 apart adjacent the runway 10, offset a convenient distance D2 from the runway centerline 11 and near one edge of runway 10 (FIG. 6). In choosing the optimum reflector spacing D1, the length of the transmitted radar pulse is a controlling factor. The spacing D1 must be greater than half the radar range distance covered during the duration of the radar pulse so that echoes received from the reflectors 100 will be clearly distinguished by the airborne radar system (i.e., the round trip distance between reflectors must be greater than the radar pulse range distance). This is important in the preferred embodiments in that the reflector images must be separated on the radar screen far enough to permit a reliable visual comparison of return "blip" arc length dimensions. For example, assuming a 1.0 μsec pulse duration, which appears to be optimum and also available in most weather radars, the range Δ R covered by the transmitted radar pulse is computed by the relation:

$$\Delta R = \frac{\text{pulse duration (μsec)} \times \text{speed of light (ft./μsec)}}{2} \quad (5)$$

For a one microsecond pulse length, ΔR becomes:

$$= \frac{1.0 \ \mu\text{sec} \times 9.833 \times 10^2 \ \text{ft.}/\mu\text{sec}}{2} = 491.6 \ \text{ft.} \approx 492 \ \text{ft.}$$

In the preferred embodiments, a reflector 200 and 202 spacing D1 of not less than 1000 feet is recommended.

The various embodiments of the present invention utilize the sharpness of the dihedral reflector's elevation-plane reflected beam pattern, or more specifically, the predetermined 3 dB points, to define a precise glide slope and approach vector for landing aircraft. As evident from equation (2) above, the larger the size of the reflector (i.e. the dimension "b"), then the sharper (i.e., more narrow) the reflected beamwidth will be, and vice versa. As such, when a large size (e.g., b=4 ft.=121.9 cm) reflector is used, the tilt angles of the reflected beams becomes very critical and the angle of the reflectors with respect to the runway surface 10 must be carefully set.

As generally indicated in FIGS. 2A and 5A, junction 105 of each reflector is typically oriented at a precise tilt angle (dependent on the desired glide slope), which is approximately perpendicular with respect to the surface of runway 10, so that as the approaching aircraft B varies in altitude it will produce a corresponding deviation in the elevation-plane reflected beam pattern from each reflector. More particularly, the reflectors are precisely tilted so that one reflector's reflected beam maximum will lie just below the desired glide slope path, the other reflector's reflected beam maximum will lie just above it, and a −3 dB equal power position within the two beams will coincide with the desired glide slope. A comparison of the relative received signal strengths of the two reflected beams will then indicate whether the aircraft is too high or too low or properly aligned relative to the desired glide slope path.

The respective tilt angles of reflectors 202 and 200 correspond to the glide slope angle plus and minus deviation angle φ (EQU. 4) for producing the −3 dB point. In other words, the reflectors are carefully tilted with respect to the runway surface 10 so that the −3 dB point of their respective reflected beamwidths are exactly aligned at the desired glide slope angle.

Figure 5B:
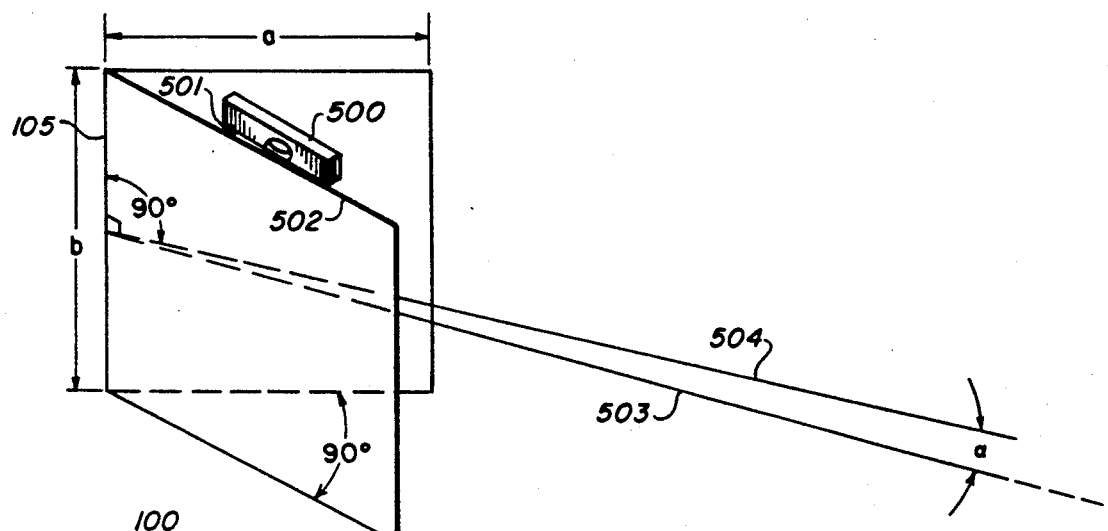
FIG. 5B is an exemplary diagram for setting reflector tilt angle.

An exemplary arrangement for setting the tilt angle of each reflector is depicted in FIG. 5B.

Since this setting is critical, it is most conveniently accomplished with a carpenter's level 500 and a shim 501 placed under one end of the level 500 along the top edge 502 of a reflector 100. The tilt angle is set by tilting the reflector 100 until the level 500 indicates a level condition with the shim 501 in place under the end of the level 500 nearest reflector panel junction 105. In a landing system according to the present invention as depicted in FIG. 6, utilizing two reflectors 202 and 200 to indicate the glide slope, the tilt angle α for each reflector measured between a line 503 parallel to runway 10 and perpendicular bisecting axis 504 is determined by adding or subtracting angle φ from the glide slope angle used for landing purposes (i.e., one reflector's tilt angle is set at glide slope plus angle φ; the other is set at glide slope minus angle φ). The size of the shim 501 is calculated using the formula:

$$\text{shim thickness (inches)} = 0.707 \times l \times \sin \alpha$$

where α is the reflector tilt angle (=glide slope±angle φ) and l is the length in inches of the carpenter's level.

As an example, if dimension b for reflectors 200 and 202 shown in FIGS. 5A and 6 is 4 ft. (i.e., b=48 in.=121.92 cm), and λ=3.2 cm (as in the above example), and if the reflected beam maximum (i.e., the axis through point C in FIG. 2A) of reflector 200 is directed upward at an angle of 2.67° with respect to the surface of runway 10, and reflector 202 correspondingly is directed at an angle of 3.33° to produce upper and lower reflected beam envelopes 201 and 203 (FIG. 5A), the median beam angle between reflectors 200 and 202 of 3.0°, corresponding to a desired glide slope angle, is thereby predetermined to be the −3 dB equal power position between the two reflectors. This occurs because by using 4 ft.×4 ft. 90° dihedral reflectors (b=48 in.=121.9 cm), the vertical reflected beam 3 dB down points are predetermined at ±0.33° (EQU.4). When the aircraft is approaching on a 3.0° glide slope angle, it will be deviating 0.33° from the beam maximums of both reflector 200 and 202. Therefore, the signal levels received in the aircraft B from each reflector will each be down 3 dB from maximum and will be equal when aircraft B is on the desired glide slope of 3.0°. Thereafter, the aircraft need only maintain a glide slope such that the received signals from each reflector 200 and 202 remain equal. The −3 dB signal level is chosen because it is a convenient conventional measure of radar signal beam width and, moreover, signal levels below this are difficult to distinguish from noise.

Figure 7:
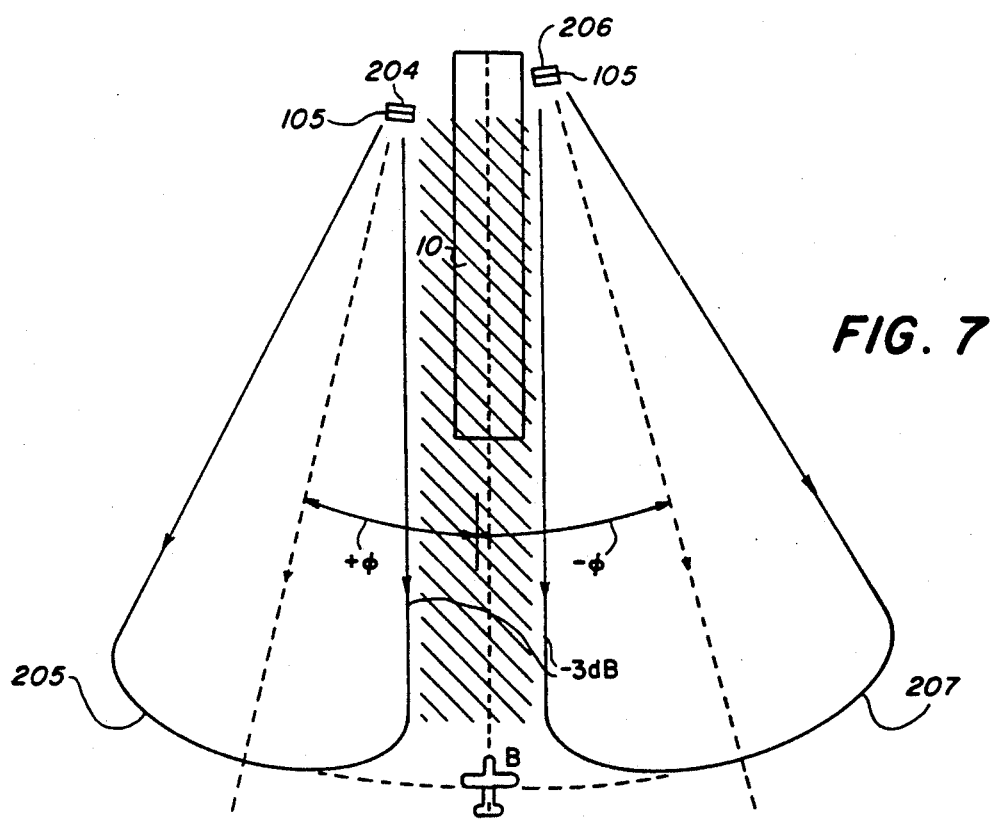
FIG. 7 is a diagrammatic view of the horizontal reflective beam patterns for two dihedral corner reflectors forming a median beam pattern along the desired approach vector.

An additional aspect of the ground-based reflector array according to the present invention, as depicted in FIGS. 6 and 7, comprises two additional dihedral reflectors 204 and 206 which are positioned on opposite sides of runway 10 and offset an equal distance D3 from the centerline 12 of reflectors 200 and 202. The spacing D3 between reflectors 204, 206 and runway 10 should be greater than the distance D2 so that the radar return images on a radar screen for reflectors 204 and 206 are displaced out-of-line from the images of reflectors 200 and 202.

The difference in proportional reflected signal strength from reflectors 204 and 206 is used to establish the desired lateral approach vector for landing aircraft B in a manner similar to that of reflectors 200 and 202. However, in this case the junction 105 of reflectors 204 and 206 must be positioned parallel to the surface of runway 10 such that any lateral displacement of the approaching aircraft B from the centerline of the runway will in fact be a deviation from a reflected beam maximum C in the dihedral bisecting plane 110 of reflectors 204 and 206. With the axis through the reflected beam maximum C, corresponding to a perpendicular centerline bisecting edge 105, for each of the reflectors 204 and 206 directed at angles $\pm\phi$, respectively, with respect to a line parallel to the centerline of runway 10 and tilted upwards at the desired glide slope angle of 3.0°, the reflectors produce in an analogous fashion a left reflected beam 205 and a right reflected beam 207 envelope, as shown in FIG. 7, whereby the half-power or −3 dB intersection of the reflected beam patterns is utilized to maintain the proper approach vector. Thus, the lateral deviation pattern is obtained in much the same manner as the vertical deviation pattern.

Figure 8:
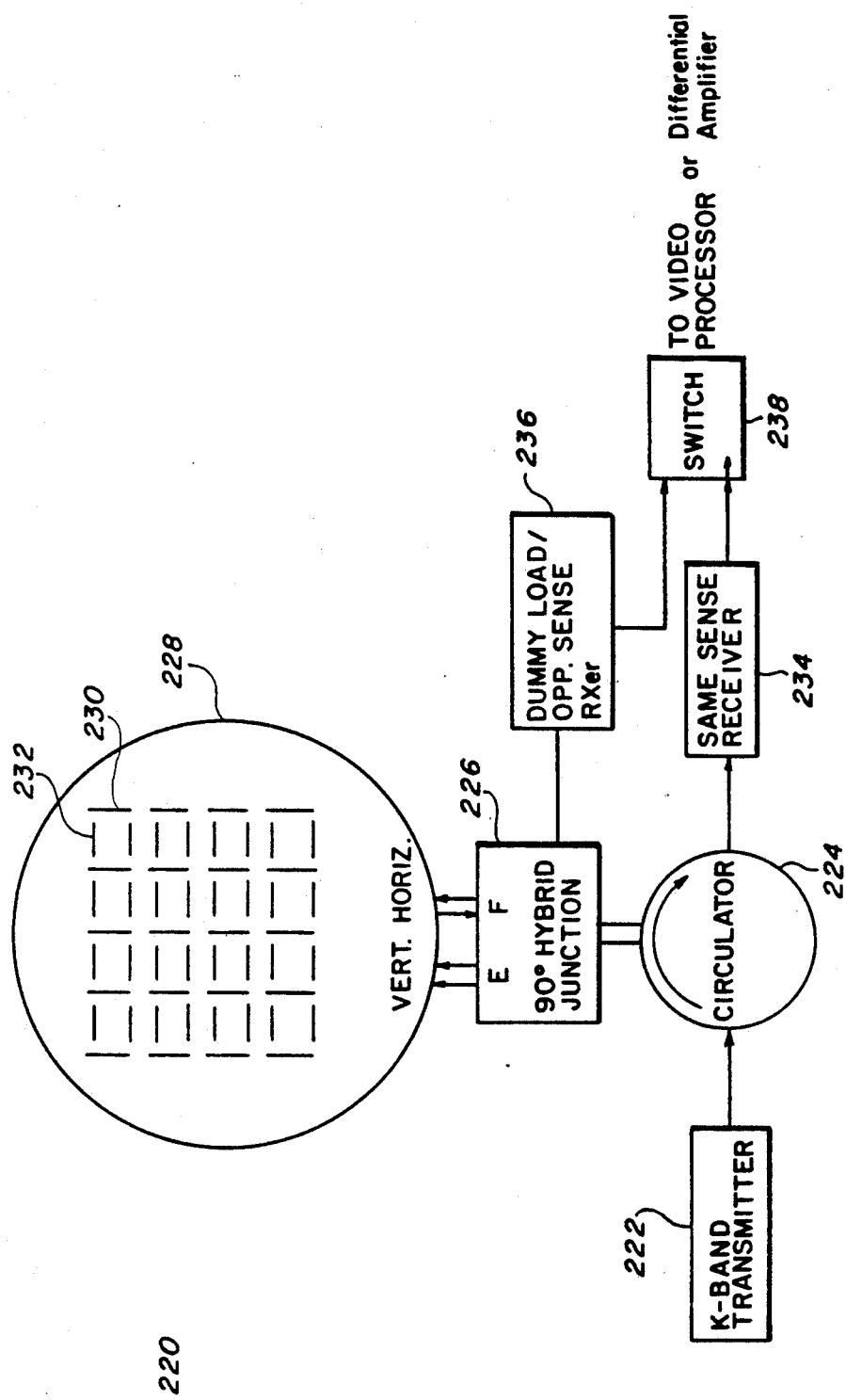
FIG. 8 is a block diagram of a radar system for transmitting and receiving circularly polarized radiation.

In one embodiment of the present invention, airborne radar system 150 is capable of transmitting and receiving a circularly polarized signal. One particular first preferred aspect, as depicted in FIG. 8, comprises X-band transmitter 222 for generating a linearly polarized signal, a circulator 224, a hybrid junction 226, and a flat plate slotted array antenna 228. A signal from transmitter 222 is coupled into circulator 224 which provides the directional coupling necessary for a radar system utilizing a single antenna for both transmitting and receiving. Thus, the transmitted signal is coupled through circulator 224 into the input of 90° hybrid junction 226. The 90° hybrid junction 226 divides and shifts the transmitted signal to provide two outputs, E and F, which are of equal amplitude and 90° out-of-phase with each other. Outputs E and F of hybrid juntion 226 then couple the transmitted signal components to the vertical and horizontal inputs of a flat plate slotted array antenna 228 having dual arrays of orthoganal slots 230 and 232. Upon transmission from antenna 228, the vertical and horizontal components radiating from the orthogonal slots 230 and 232 combine 90° out-of-phase to form and transmit a circularly polarized radar signal.

Again referring to FIG. 8, a reflected circularly polarized radar signal is in turn received via orthogonal slots 230 and 232 in antenna 228. The arrays of orthogonal slots 230 and 232 reduce the circularly polarized wave into its vertical and horizontal components. The vertical and horizontal components from the received signal are then coupled into what are presently inputs E and F of 90° hybrid junction 226. The hybrid junction 226 acts to combine the reflected signal's components to generate two linearly polarized signals, one indicative of same-sense reflections received, and the other indicative of opposite-sense reflections. A linearly polarized signal indicative of same-sense reflections is coupled from hybrid polarizer 226 into circulator 224. Circulator 224 acts to directionally couple said received signal into same-sense receiver 234. The output of same-sense receiver 234 is then sent for futher processing to processing means.

Referring back to 90° hybrid junction 226, a linearly polarized signal indicative of undesired opposite-sense reflections is coupled from junction 226 into an opposite sense receiver 236. (If one desires not to use this information, opposite sense reflection signals may be coupled via the hybrid junction 226 to a dummy load in place of the receiver). The output of the opposite sense receiver may be coupled through a differential amplifier with the output of the same sense receiver resulting in a difference signal. Such a difference signal is known to further reduce dangerous ground and foilage clutter. Alternatively, a signal switch means 238 may be provided at the outputs of the receivers 234 and 236 (e.g., before any video processing circuitry or PPI display).

The output from the opposite sense receiver provides excellent weather radar information, and this aspect of the present embodiment allows a pilot to switch between landing and weather radar functions.

Figure 9:
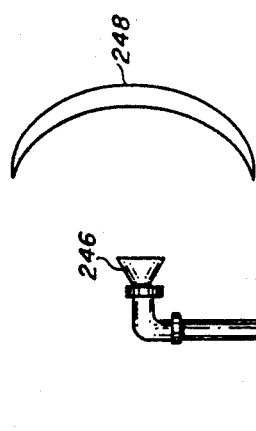
FIG. 9 is a diagrammatic view of an alternative radar system for transmitting and receiving circularly polarized radiation.

Referring to FIG. 9, an alternate second aspect of an airborne radar system for generating circularly polarized signals comprises a receive/transmit unit 240 for initially transmitting a linearly polarized signal which is coupled into a waveguide hybrid polarizer 242. The hybrid polarizer 242 converts the linearly polarized transmission into a circularly polarized signal which propagates through square waveguide 244 to antenna feed horn 246. Antenna feed horn 226 subsequently irradiates antenna reflector 248 resulting in a transmitted circularly polarized radar signal.

Reflected signals are received by antenna reflector 248 and focused towards feed horn 246. The received circularly polarized signals are coupled through square waveguide 244 to hybrid polarizer 242. Hybrid polarizer 242 converts same-sense reflections into a linearly polarized signal which is directionally coupled to receive/transmit unit 240. Opposite sense reflections are simultaneously converted and coupled to dummy load 250.

Figure 10:
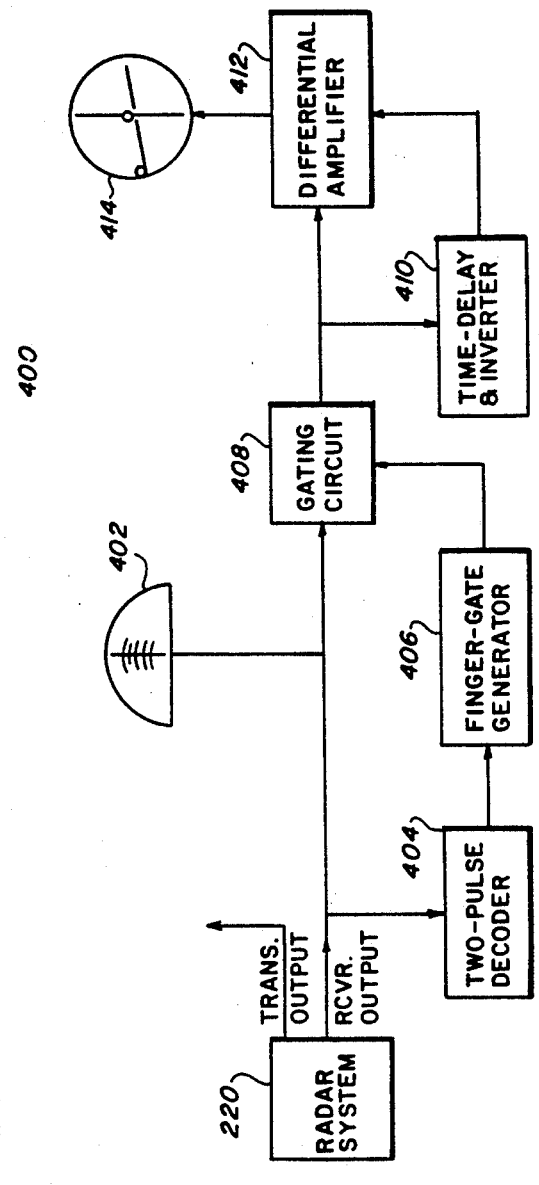
FIG. 10 is a block diagram of radar signal processing circuitry for generating display signals indicating the deviation of an aircraft from a desired landing course.

FIG. 10 shows one embodiment of an airborne radar signal processing system 400 that may be used with the radar transceiver arrangements discussed above. Receiver output indicative of the time and amplitude of reflections received by radar system 220 is coupled to a typical Plan Position Indicator (PPI) display 402.

A two-pulse decoder 404 is coupled to the receiver output and is designed to produce an output signal upon detecting two pulses spaced at a known time interval. Referring again to FIG. 6, in a modified embodiment of the landing system's ground-based reflector array, additional dihedral reflectors 208 and 210 are positioned a distance D2 from centerline 11 of the runway 10 at a precise distance D4 apart. Reflections directed along the glide slope from reflectors 208 and 210 will produce two pulses spaced at a precisely known time interval in the radar receiver when the aircraft B is in the general vicinity of the landing runway 10.

The decoder output signal triggers a conventional finger-gate generator 406, which supplies narrow width control signals spaced precisely in time so as to coincide with the arrival of subsequent reflected pulses from reflectors 200 and 202 in FIG. 6. The control signals from generator 406 control a gating circuit 405 connected between the receiver output and the subsequent signal processing circuitry described below. The use of reflectors 208 and 210 with two-pulse decoder 404 and finger gate generator 406 housed in aircraft B ensures that only reflections from the remaining four reflectors 200-206 will be processed by the signal processing circuitry. The probability of two strong same sense reflections from false targets spaced a precise known time interval apart is extremely low. Thus, this modified embodiment of the reflector array of the invention utilizes dihedral reflectors 208 and 210 to provide the signal processing system with an indication that aircraft B is in the general proximity of the runway, and to further enable the processing system to detect only reflections from the remaining four reflectors.

Referring back to FIG. 10, the finger-gating allows signals representative of the amplitude of the reflections from reflectors 200 and 202 to enter time delay and inverter 410 and differential amplifier 412. In order to compare the amplitude of the successive pulses, the reflected pulse from reflector 200 that arrives first in time is inverted and time delayed at 410 to coincide with the arrival of the reflected pulse from reflector 202 at the input of differential amplifier 412. The output of the differential amplifier 412 represents the difference in amplitude between the two input pulses. The output of the differential amplifier 412 is coupled to drive a typical crossed pointer indicator (CPI) 414 in order to provide a visual indication of the aircraft's present glide slope angle.

Similarly, subsequently received reflection signals from reflectors 204 and 206 are also timely processed via finger-gate generator 406, gating circuit 408, time delay and inverter 410, differential amplifier 412, and crossed pointer indicator 414. Thus, any lateral (i.e., course) deviation from the desired approach vector will appear as such on the crossed pointer indicator 414.

In a second preferred embodiment of the present invention, the ground-based reflector array consists of only two large (i.e., larger than that normally required for circularly polarized radiation) dihedral reflector units (e.g., 4 ft.×4 ft., i.e., a b=121.9 cm) and the radar signal processing system may consist solely of conventional standard modern weather radar equipment that utilizes a PPI.

In this particular embodiment, when using a standard linearly-polarized wave weather radar system as the airborne equipment, it is advantageous to use ground-based reflectors that are somewhat larger than that used for the circularly-polarized wave embodiment. The larger reflectors produce a narrower reflected vertical −3 db beamwidth (see Equ. (4)) and provide a better S/N (signal-to-noise) ratio that helps to override interference and false target reception (e.g., from rain clutter or buildings) to which linearly-polarized wave systems are inherently more susceptible. This embodiment, since only two (large) reflectors are needed, has the advantage of improving portability and minimizing cost. Moreover, lateral deviation can still be detected by misalignment at the two reflector echoes with the aircraft's heading or ground track.

If in an exemplary two-reflector system, when used in conjunction with an airborne radar comprising a standard/linearly-polarized wave weather radar and display, each reflector is 4 ft.×4 ft. (i.e., a=b=48 in. 121.92 cm), then from equation (3) above, the reflected beamwidth angle $\beta$ at x-band ($\lambda$=3.2 cm) is obtained by performing the following calculation:

$$\beta = \frac{50° \times 3.2 \text{ cm}}{121.9 \text{ cm}} = 1.3123°$$

When the receiver and transmitter share the same antenna at the same location and together deviate vertically from bisecting plane 112, as in the case of an airborn radar in the instant embodiment, the deviation angle off plane 112 to a −3 dB point, becomes $\beta/4°$, which from equation (4) is 0.328° when dimension b is 48 inches (121.9 cm) and $\lambda$=3.2 cm. Accordingly, as shown in FIGS. 5A and 5B, the deviation angle calculated as above, e.g., 0.33° in the case of the disclosed exemplary embodiment, is added to the glide slope angle (3.0°) to set the tilt with respect to runway 10 of the upper beam reflector 202 (3.33°); and is subtracted from the glide slope angle to set the tilt of the lower beam reflector 200 (2.67°). The tilt of each reflector can be set by using a carpenter's level in conjunction with an appropriate size shim as previously discussed above.

As explained above, if an aircraft B is on the desired glide slope the reflected signal strength received from each reflector is equal. Thus, for example, if the signal received from reflector 200, which marks the lower boundary of the glide path, is shown to have a greater signal strength than that from reflector 202 (the higher boundary), then this would indicate the plane is slightly below glide slope.

Although the screen brightness of a radar return spot or "blip" displayed on a standard weather radar display screen is uniform for all returns regardless of returned signal strength, the size of the blip in the "azimuth" or length direction on the display will be greater for strong return signals than for weak return signals. As radar return signal levels increase, the length of the radar return blip displayed on the screen will increase and hence signal levels can be visually compared on the basis of arc length differences in the "azimuth" (or horizontal) dimension, as illustrated in FIGS. 11 and 12.

Figure 11A:
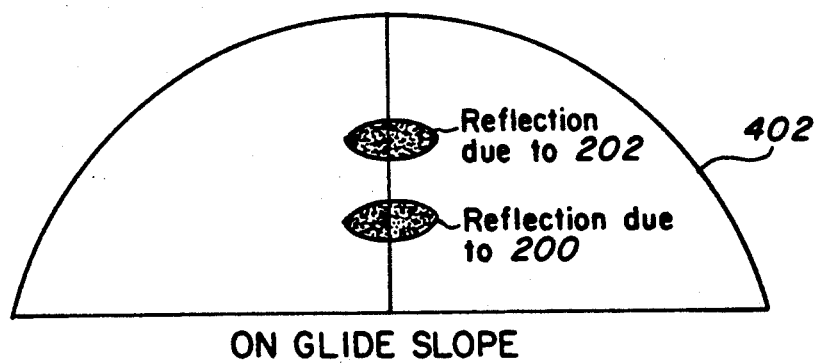
FIGS. 11(A), (B) and (C) show typical PPI (Plan Position Indicator) displays indicating glide slope position for a two reflector system.
Figure 11B:
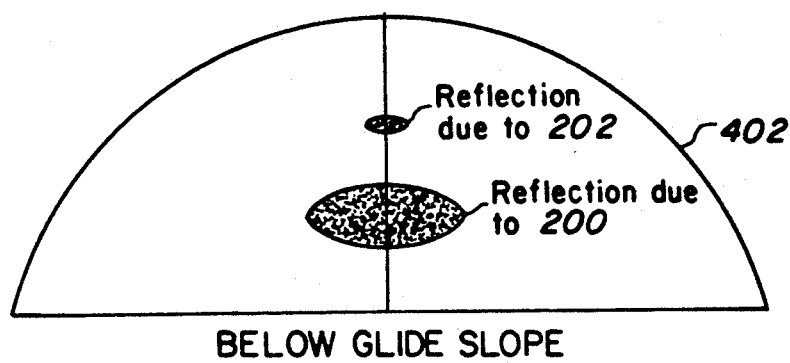
Figure 11C:
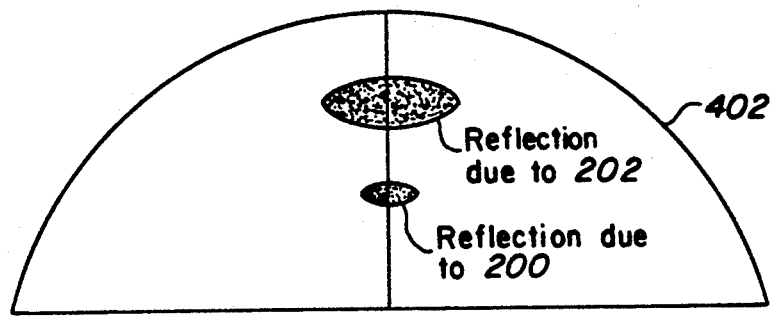

FIGS. 11(A), (B), and (C) show a typical Plan Position Indicator (PPI) type display 402 indicating glide slope position based on the received reflections from reflectors 200 and 202. Specifically, FIG. 11(A) shows reflections of equal amplitude from both reflectors, indicating that the aircraft B is on the proper glide slope. FIG. 11(B) shows a stronger reflection due to reflector 200, indicating that the aircraft B is travelling below the proper glide slope. Similarly, FIG. 11(C) shows a stronger reflection due to reflector 202 thereby indicating that the aircraft B is travelling above the proper glide slope.

Figure 12A:
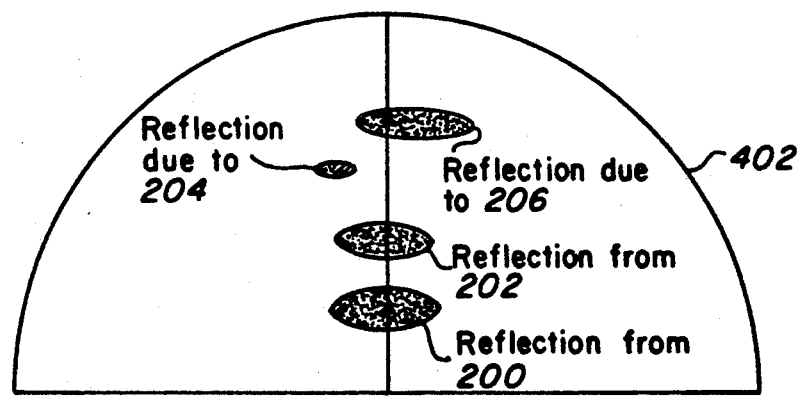
FIGS. 12(A), (B) and (C) show typical PPI displays indicating both glide slope position and approach vector.
Figure 12B:
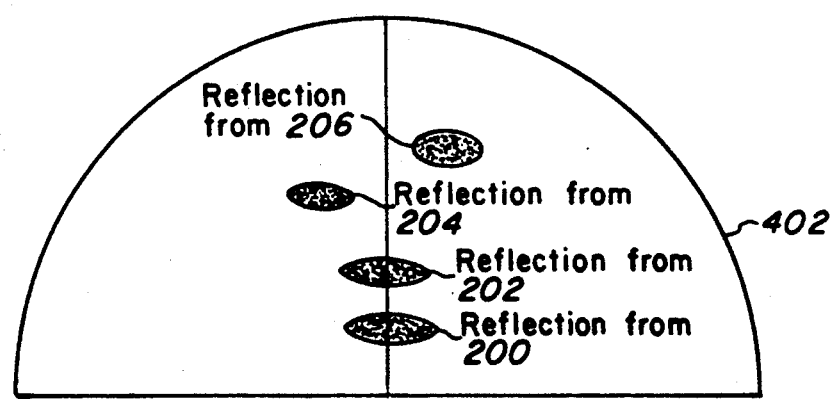
Figure 12C:
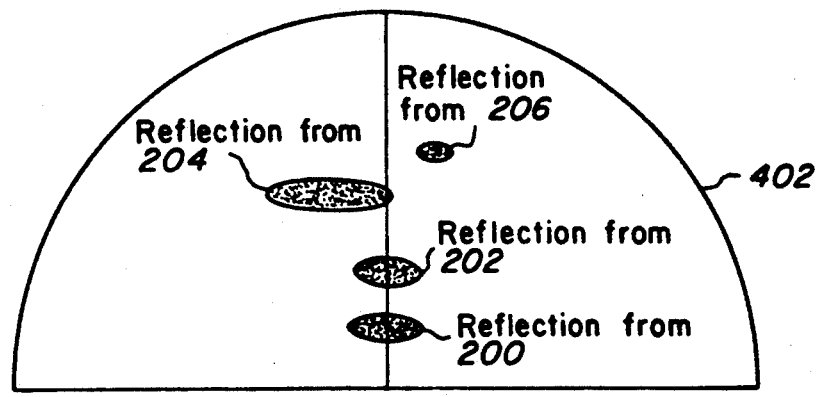

In addition to the reflections received from reflectors 200 and 202, as mentioned above, reflections may also be subsequently received from reflectors 204 and 206 (FIG. 6). FIGS. 12(A), (B) and (C) show a typical PPI display 402 indicating both the glide slope as discussed above, and the approach vector which is based on the received reflections from reflectors 204 and 206. FIG. 12(A) indicates that the aircraft B is approaching too far right of the runway 10 based on the received reflection from reflector 206 having a greater amplitude than reflector 204. FIG. 12(B) shows the aircraft B is on course with the proper approach. FIG. 12(C) shows reflections of equal amplitude indicating a stronger reflection from reflector 204, indicating the aircraft B is approaching too far from the left.

The present invention therefore permits the safe landing of an aircraft under all weather conditions by using an inexpensive but precise system which eliminates the dangers involved with previous passive reflector landing systems (e.g., dangers of opposite sense reflections have been significantly eliminated). Using either the circularly-polarized wave or linearly-polarized wave airborne radar embodiment of the invention along with the 90° dihedral ground-based reflector system allows for a safer, more portable, and precise all-weather landing system than provided by the prior art.

It will be understood that the embodiments described herein are merely exemplary and various other configurations of the landing system are contemplated. For example, the radar system housed in the aircraft may be a presently existing same sense circularly polarized system, or one adapted for such use.

I claim:

1. An all-weather landing system for aircraft comprising:
    radar means housed in an aircraft;
    a plurality of passive 90° dihedral corner reflectors positioned in a predetermined array for producing two-bounce reflected signals from incident transmitted signals from said radar means without substantial ground reflections, each reflector producing a reflected signal of the same rotational sense as the incident signal, such that at least two dihedral reflectors are positioned a distance D apart along an axis adjacent an aircraft runway and parallel to said runway centerline, said two dihedral reflectors' vertex junctions being oriented generally perpendicular to said runway surface such that reflected beam signal strength maximums in the plane bisecting each dihedral angle respectively are directed at differing angles with respect to said runway surface to produce a narrow upper reflected beam pattern and a lower reflected beam pattern envelope resulting in a median beam angle along an equal power intersection of said narrow upper and lower reflected beam patterns corresponding to the desired glide slope for said runway; and
    reflection signal processing circuitry means in said aircraft for processing reflected signals from said dihedral reflectors to provide an indication of said approach vector and glide slope of said aircraft.

2. The system of claim 1, wherein said radar means comprises:
    means for receiving a circularly polarized signal of the same rotational sense as transmitted.

3. The system of claim 2, wherein said radar means further comprises:
    a flat plate phased array antenna with dual orthogonal sets of slots;
    a 90° hybrid junction which feeds both said orthogonal sets of slots of said array, thereby creating a circularly polarized signal, and
    said receiving means comprises a same sense receiver coupled to said hybrid junction.

4. The system of claim 1, wherein said radar means comprises:
    means for receiving a circularly polarized signal of the opposite rotational sense as transmitted by said radar means.

5. The system of claim 4, wherein said radar means further comprises:
    a flat plate phased array antenna with dual orthogonal sets of slots;
    a 90° hybrid junction which feeds both said orthogonal sets of slots of said array, thereby creating a circularly polarized signal; and
    said receiving means comprises an opposite sense receiver coupled to said hybrid junction.

6. The system of claim 1, wherein said radar means comprises means for converting linear polarized radar transmissions into circularly polarized radar transmissions.

7. The system of claim 6, wherein said conversion means comprises a hybrid waveguide polarizer.

8. The system of claim 1, wherein said predetermined array pattern of 90° dihedral corner reflectors further includes:
    at least two additional dihedral reflectors positioned on opposite sides of said runway a distance D apart along and offset a distance D from said axis running parallel to said runway centerline, wherein said additional reflectors' vertex junctions are oriented parallel to the surface of said runway such that the reflected beam signal strength maximums in the plane bisecting each dihedral angle respectively are directed at differing angles with respect to said axis parallel to the centerline of said runway and tilted upwards at the desired glideslope angle to produce a left reflected beam pattern and a right reflected beam pattern envelope resulting in a median beam angle along an equal power intersection of said left and right reflected beam patterns, corresponding to the desired approach vector for said runway.

9. The system of claim 1, wherein said predetermined array pattern of 90° dihedral corner reflectors further includes:
    at least two additional dihedral reflectors positioned a distance D apart along said axis running parallel to said runway centerline, capable of producing runway proximity reflection pulses of a known separation in time which are initially detected by said radar means and utilized to enable said reflection signal processing circuitry means to allow processing of reflected signals received subsequent to said proximity pulses.

10. The system of claim 1, wherein the equal power intersection of said upper and lower reflected beam patterns corresponding to the desired glide slope is the half-power signal strength position for each reflected beam pattern.

11. The system of claim 8, wherein the equal power intersection of said left and right reflected beam patterns corresponding to the desired approach vector is the half-power signal strength position for each reflected beam pattern.

12. The system of claim 1, wherein said means for processing reflected signals from said dihedral reflectors comprises:
    a finger gate generator producing a series of control signals whose spacing are calculated to coincide with the reflected pulses of said plurality of reflectors and eliminate unwanted reflections; and
    a differential amplifier for detecting a deviation in the relative amplitude of said reflected beam patterns, whereby such deviation in amplitude indicates a variance from said desired glide slope or approach vector.

13. The system of claim 8, wherein said means for processing reflected signals further include:
    a two-pulse decoder which upon detecting said pair of predetermined, precisely spaced, reflected radar pulses, enables said finger gate generator.

14. The system of claim 1, wherein said means for processing reflected signals from said dihedral reflectors includes:
    a radar PPI (Plan Position Indicator) display to visually indicate amplitude strength of reflected signals.

15. The system of claim 1, wherein said means for processing further comprises:
    a crossed pointer indicator video display for converting the output of said differential amplifier into a visual display or glide slope and approach vector.

* * * * *